US009702454B1

(12) United States Patent
Raguse et al.

(10) Patent No.: US 9,702,454 B1
(45) Date of Patent: Jul. 11, 2017

(54) GEARBOX SHIFT LOCK

(71) Applicant: C&J Spec-Rent Services, Inc., Houston, TX (US)

(72) Inventors: Benjamin Lyle Raguse, Houston, TX (US); Daniel Brooks Schmidt, Cypress, TX (US); Ronald Mark Sherwood, Missouri City, TX (US)

(73) Assignee: Penny Technologies S.À.R.L., Luxembourg (LU)

( * ) Notice: Subject to any disclaimer, the term of this patent is extended or adjusted under 35 U.S.C. 154(b) by 26 days.

(21) Appl. No.: 14/673,138

(22) Filed: Mar. 30, 2015

(51) Int. Cl.
*F16H 59/38* (2006.01)
*F16H 61/00* (2006.01)
*F16D 25/12* (2006.01)
*F16H 63/30* (2006.01)
*F16H 59/72* (2006.01)
*F16H 61/02* (2006.01)
*F16H 59/68* (2006.01)

(52) U.S. Cl.
CPC ......... *F16H 61/0021* (2013.01); *F16H 59/38* (2013.01); *F16H 59/72* (2013.01); *F16H 61/0206* (2013.01); *F16H 63/3023* (2013.01); *F16D 25/12* (2013.01); *F16H 2059/683* (2013.01)

(58) Field of Classification Search
CPC ...... F16H 59/38; F16H 61/0021; F16H 59/72; F16H 61/0206; F16H 63/3023; F16H 2059/683; F16H 61/0202; F16H 2061/0209; F16H 2061/0253; F16H 61/0276–61/029; F16D 2500/1028; F16D 25/10; F16D 25/12
See application file for complete search history.

(56) References Cited

U.S. PATENT DOCUMENTS

| | | | | |
|---|---|---|---|---|
| 5,441,459 | A | * 8/1995 | Inukai | F16H 61/0021 475/123 |
| 7,832,538 | B2 | 11/2010 | Robinson | |
| 2010/0030436 | A1 | * 2/2010 | Suzuki | B60W 10/02 701/54 |
| 2011/0077124 | A1 | * 3/2011 | Moorman | F16H 61/0021 477/152 |
| 2011/0209470 | A1 | * 9/2011 | Dougan | F16H 61/0021 60/413 |
| 2012/0073394 | A1 | * 3/2012 | Ren | F16H 3/0915 74/325 |
| 2013/0180358 | A1 | * 7/2013 | Ren | F04B 23/00 74/730.1 |
| 2014/0054126 | A1 | * 2/2014 | Whitmarsh | F16H 61/0206 192/85.61 |

* cited by examiner

*Primary Examiner* — Ramya Burgess
*Assistant Examiner* — Lillian Nguyen
(74) *Attorney, Agent, or Firm* — McGlinchey Stafford, PLLC; R. Andrew Patty, II

(57) ABSTRACT

A fluid powered circuit for a gearbox and a method for protecting a gearbox are disclosed. The fluid powered circuit includes a control circuit operatively connected to a clutch engagement circuit. The fluid powered circuit is selectively operable to either flow a fluid from a fluid supply source to the clutch or vent the fluid to the atmosphere. The method for protecting the gearbox includes flowing the fluid from the fluid supply source to the fluid powered circuit, measuring the speed of the shaft, measuring the pressure of the fluid entering the clutch engagement circuit, and flowing the fluid from the fluid powered circuit to the clutch upon detecting one or more conditions.

22 Claims, 4 Drawing Sheets

GEARBOX SHIFT LOCK

BACKGROUND OF THE INVENTION

Field of the Invention

The present disclosure relates to apparatuses and systems for controlling the engagement and/or disengagement of a clutch using fluid pressure.

Description of Related Art

Gearboxes of various blenders and pumps, including for example, those used for slurry pumps, are typically shifted into gear using fluid pressure (e.g., pneumatic, hydraulic, etc.). However, normal service conditions of conventional systems often cause excessive wear and tear. For example, if the fluid pressure supplied to maintain engagement between the clutch and the gearbox reduces below a certain threshold during operation, the clutch of the gearbox can disengage in an untimely fashion and become prematurely damaged.

Accordingly, there remains a need in the art for a fluid powered circuit that is capable of protecting a gearbox from damage due to reduction in fluid pressure.

BRIEF SUMMARY OF THE INVENTION

The invention meets the foregoing and/or other needs by providing, in at least in some aspects of the invention, an apparatus and method for preventing inadvertent disengagement of the clutch due to unintended reduction in fluid pressure in the clutch engagement circuit during operation.

Aspects of the invention prevent premature destruction of a pneumatically or hydraulically operated gearbox that otherwise results when shifting the gear box in and/or out of gear when it is operating at a high revolutions per minute (RPM).

Certain aspects of the invention provide additionally a status indicator for determining that sufficient fluid pressure is available to shift the gearbox and specifying the status of the clutch.

Certain aspects of this invention enable one or more of these advantages while using components that work independently from a conventional pneumatically or hydraulically operated gearbox control system.

Thus, in one of its aspects, the invention provides a fluid powered circuit for a gearbox. The fluid powered circuit includes a control circuit, and a clutch engagement circuit operatively connected to the control circuit. The fluid powered circuit is configured to be selectively operable to either flow a fluid from a fluid supply source to a clutch or vent the fluid to the atmosphere.

In another aspect, the invention provides a method for protecting a gearbox. The method includes the following steps: flowing a fluid from a fluid supply source to a fluid powered circuit, measuring the speed of the shaft associated with the gearbox, measuring the pressure of the fluid entering a clutch engagement circuit, and flowing the fluid from the fluid powered circuit to the clutch upon detecting that the pressure of the fluid entering the clutch engagement circuit is sufficient to engage the clutch, and that the speed of the shaft is at or below about 125% of the recommended idling speed.

The above brief summary of the invention presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented below.

Additionally, the above brief summary has outlined rather broadly the features and technical advantages of the present invention in order that the detailed description of the invention that follows may be understood. Additional features and advantages of the invention will be described hereinafter, which form the subject of the claims of the invention. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features, which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE SEVERAL VIEWS OF THE DRAWINGS

The accompanying drawings illustrate preferred embodiments of this invention. However, it is to be understood that these embodiments are not intended to be exhaustive, nor limiting of the invention. These embodiments are but examples of some of the forms in which the invention may be practiced. Like reference numbers or symbols employed across the several figures are employed to refer to like parts or components illustrated therein.

DETAILED DESCRIPTION OF THE INVENTION

Figure 1:
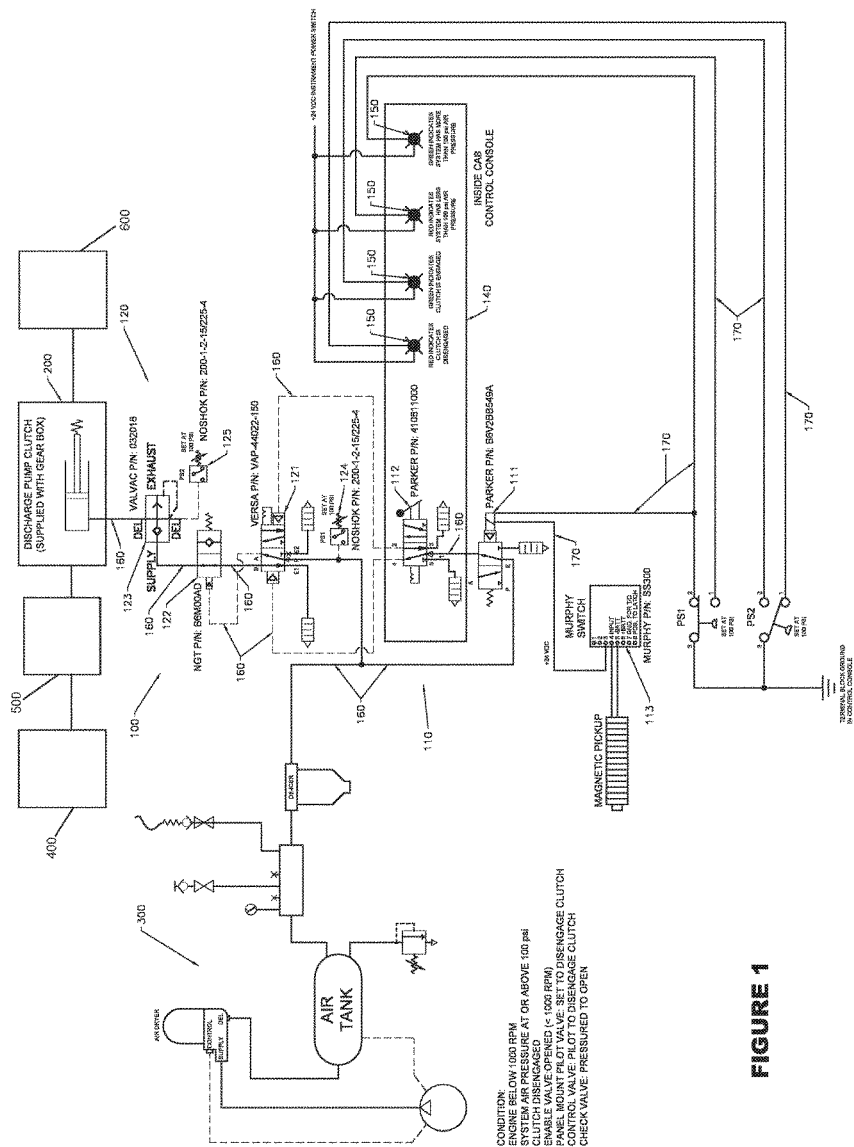
FIG. 1 illustrates an embodiment of a fluid powered circuit in accordance with this invention with the clutch disengaged.

Without any intent to limit the scope of this invention, reference is made to the figures in describing various embodiments of the invention. FIGS. 1-4 illustrate various embodiments of a fluid powered circuit 100 for a gearbox 400 in accordance with this invention. The gearbox 400 has a shaft 500 that is actuated by a motor 600 through a clutch 200, and can have a spring loaded clutch cylinder. The clutch 200 can be moved to either an engaged or disengaged position using fluid pressure (e.g., pneumatic, hydraulic, etc.) For example, the clutch 200 can be pneumatically operated by flowing a fluid from a fluid supply source 300 (e.g., an air compressor) through the fluid powered circuit 100. An example of a suitable gearbox including a clutch for use with this invention includes, but is not limited to, a reduction gearbox (Model No. GR1600E), which is available from Cotta™ Transmission Company, LLC of Beloit, Wis.

The fluid powered circuit 100 is selectively operable to either flow the fluid from the fluid supply source 300 to the clutch 200 or vent the fluid to the atmosphere (e.g., vent the fluid directly to the atmosphere or to a vessel at or near atmospheric pressure). It should be appreciated that the fluid powered circuit 100 can be a component integral with a new gearbox system, or it can be a retrofit to an existing gearbox system.

The fluid powered circuit 100 includes a control circuit 110 that is operatively connected to a clutch engagement circuit 120. The control circuit 110 is configured to allow the clutch engagement circuit 120 to flow the fluid from the fluid supply source 300 to the clutch 200 upon detection of one or more conditions. For example, in an embodiment, the control circuit 110 includes a solenoid valve 111 that is fluidly connected to the fluid supply source 300 by conduit 160. The solenoid valve 111 is configured to open and flow the fluid from the fluid supply source 300 to the clutch engagement circuit 120 upon detection of the one or more conditions. If the one or more conditions are not detected, then the solenoid valve 111 can vent the fluid to the atmosphere.

The solenoid valve 111 can be fluidly connected to a manually operated valve 112 by conduit 160. The manually operated valve 112 is configured to allow an operator to selectively flow the fluid to the clutch engagement circuit 120 upon detection of the one or more conditions. For example, in an embodiment, the manually operated valve 112 can be mounted on a control panel 140 to permit the operator to easily open or close it. If the one or more conditions are met, then the operator can open the manually operated valve 112. On the other hand, if the one or more conditions are not met, then the operator can keep the manually operated valve 112 closed and the fluid can be vented to the atmosphere. Alternatively, the manually operated valve 112 can be an electrically actuated valve, with either a remote operator or with a set of computer instructions that would dictate engagement or disengagement of the clutch.

The solenoid valve 111 and manually operated valve 112 can be selected based on system requirements and conditions such as fluid type, temperature, pressure, flow rate and so forth. An example of a suitable solenoid valve 111 for use with this invention includes, but is not limited to, a 3-way, 2 position single solenoid valve (Part No. B6V2BB549A), which is available from Parker Hannifin Corporation of Richland, Mich. An example of a suitable manually operated valve 112 for use with this invention includes, but is not limited to, a 4-way toggle operated valve (Part No. 410811000), which is available from Parker Hannifin Corporation of Richland, Mich.

In an embodiment, the one or more conditions are at least the following concurrent conditions: (1) the pressure of the fluid in the clutch engagement circuit 120 is sufficient to engage the clutch 200, and (2) the speed of the shaft that is actuated by the motor through the clutch 200 is at or below about 125% of the recommended idling speed. To detect the one or more conditions, the fluid powered circuit 100 can be provided with one or more sensors. For example, the solenoid valve 111 can be operatively connected to a speed sensor 113 to detect the shaft speed, and a pressure sensor 124 to detect the pressure of the fluid.

Figure 2:
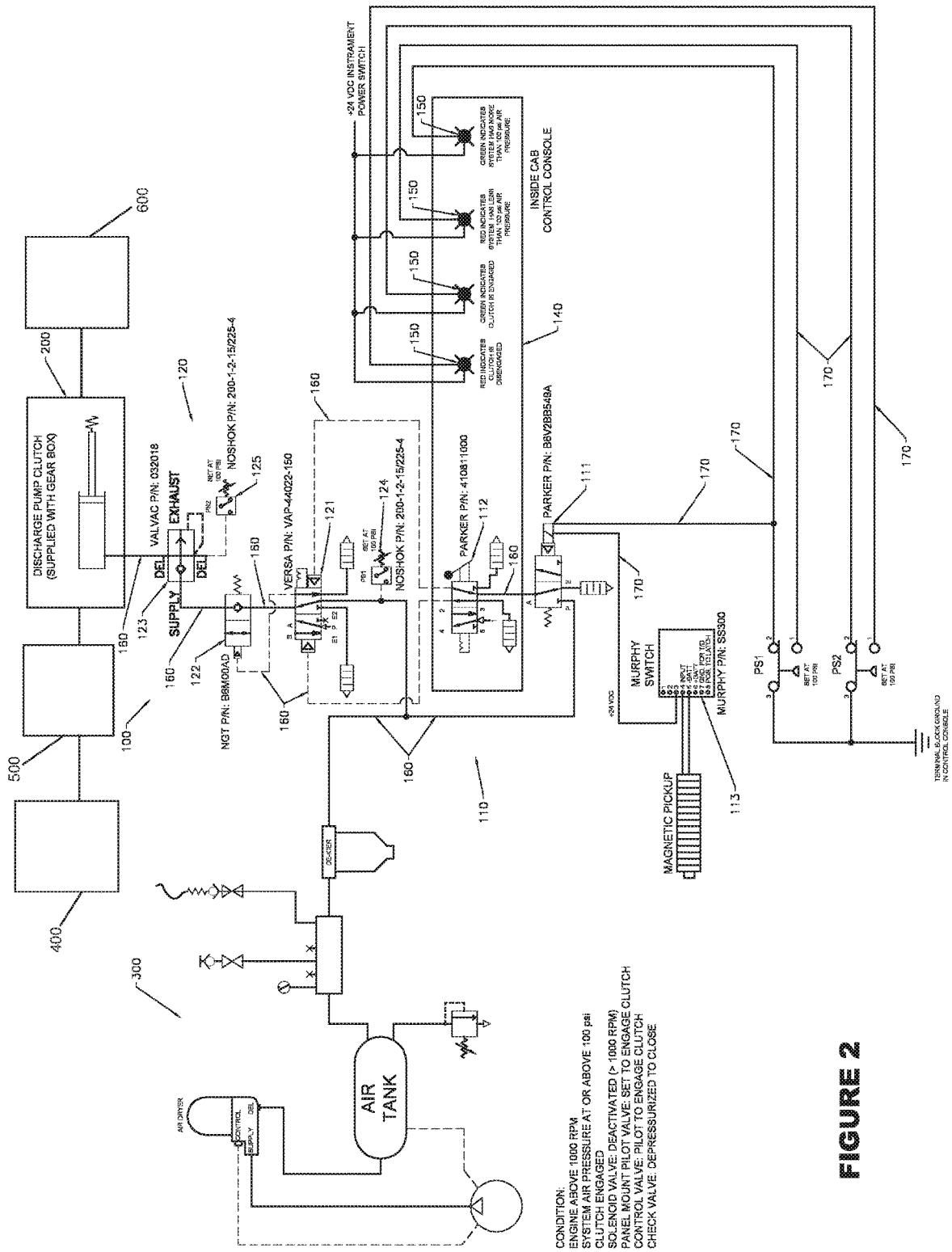
FIG. 2 illustrates the fluid powered circuit shown in FIG. 1 with the clutch engaged.
Figure 3:
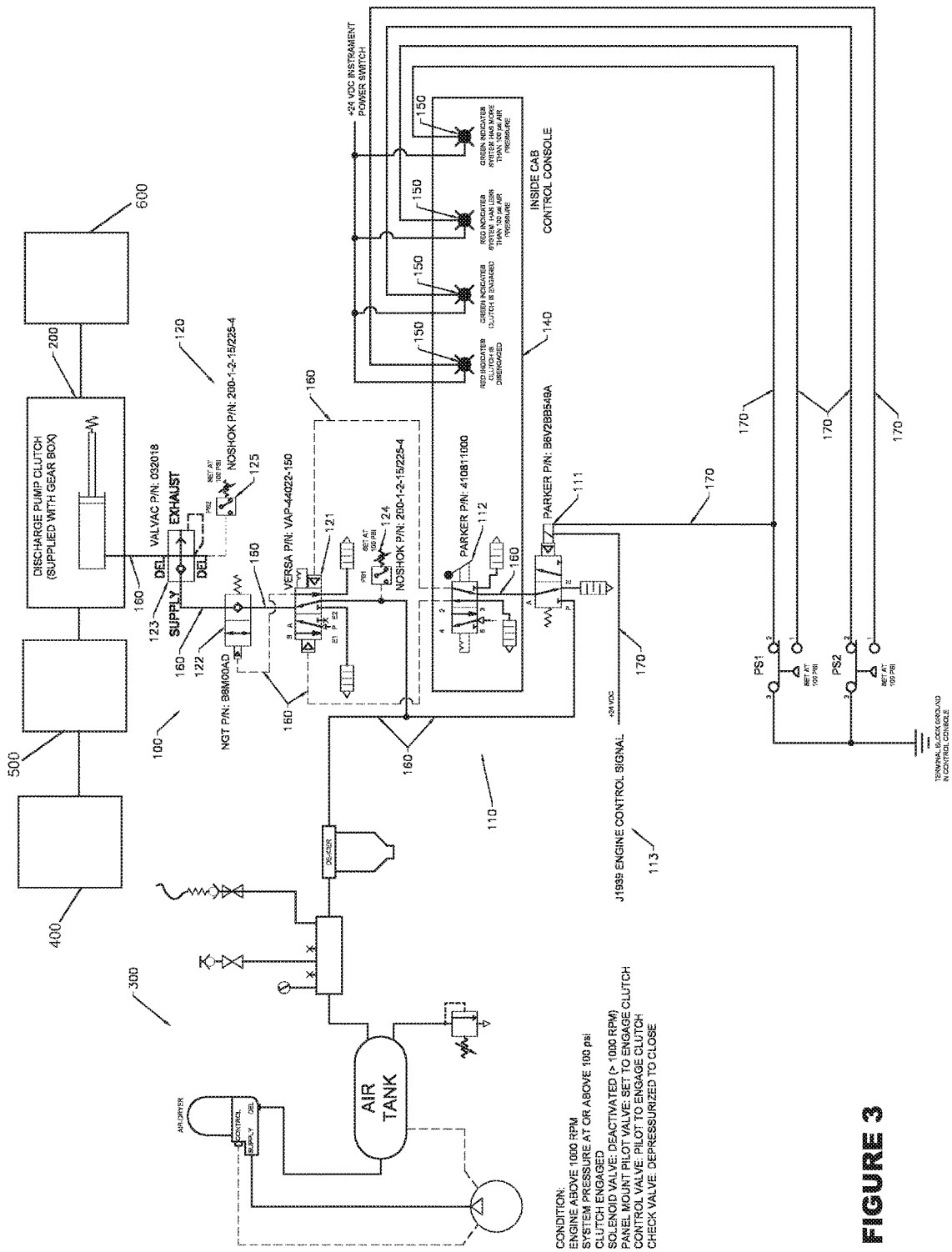
FIG. 3 illustrates an embodiment of a fluid powered circuit in accordance with this invention with the clutch engaged.

As shown in FIG. 2, the speed sensor 113 can comprise a single point speed switch with a magnetic pickup operatively connected to the shaft. Alternatively, as shown in FIG. 3, the speed sensor 113 can comprise a signal that comes from a digital controller from the motor of the gearbox. The speed sensor 113 can be located at any location suitable for detecting the speed of the shaft. The speed sensor 113 can be selected based on system requirements and conditions such as shaft speed, temperature, and so forth. An example of a speed sensor 113 for use with this invention includes, but is not limited to, a single point speed switch (Part No. SS300), which is available from Ennovation Controls™, LLC of Tulsa, Okla.

The pressure sensor 124 can comprise a pressure switch that is fluidly connected to the fluid powered circuit 100. The pressure sensor 124 can be located at any location suitable for detecting the pressure of the fluid available to the clutch 200. For example, the pressure sensor 124 can be located at or near the entrance of the clutch engagement circuit 120. The pressure sensor 124 can be selected based on system requirements and conditions such as fluid type, flow, pressure, temperature, and so forth. An example of a pressure sensor 124 for use with this invention includes, but is not limited to, a mechanical pressure switch (Part No. 00-1-2-15/225-), which is available from Noshok™ Inc. of Berea, Ohio.

The clutch engagement circuit 120 includes a control valve 121 that is fluidly connected to the fluid supply source 300 and a check valve 122 by conduit 160. The clutch engagement circuit 120 preferably includes an exhaust valve 123 that is fluidly connected to the check valve 122 by conduit 160. The exhaust valve 123 is configured enable rapid evacuation of fluid pressure from the clutch cylinder at a rate sufficient to prevent the clutch 200 from partially slipping, which can damage the clutch 200. Without the exhaust valve 123, when the fluid is evacuated from the clutch 200, the clutch could partially slip if the control valve 121 cannot evacuate the fluid at a sufficient rate.

The control valve 121 and the check valve 122 can have at least one pilot, i.e., the valves 121, 122 can be pilot operated valves. The pilot opens its respective valve and allows the valve to flow the fluid when the pressure of the fluid in communication with the pilot reaches a predetermined level. If the pressure of the fluid does not reach the predetermined level, then its respective valve will not open and the valve can vent the fluid to the atmosphere. In addition, by providing the check valve 122, the fluid powered circuit 100 can prevent disengagement of the clutch 200 if the pressure of the fluid entering the clutch engagement circuit 120 is not sufficient to maintain the engagement of the clutch 200. Specifically, the check valve 122 is configured to maintain the pressure of the fluid in the clutch engagement circuit 120 from the check valve 122 to the clutch 200 at a sufficient level to prevent premature disengagement of the clutch 200. That is, the check valve 122 traps sufficient pressure to maintain clutch engagement irrespective of the system pressure on the upstream side of check valve 122, i.e., from the check valve 122 to the fluid supply source 300.

In an embodiment, the pilot of the control valve 121 is fluidly connected by conduit 160 to either the solenoid valve 111 or the manually operated valve 112 depending upon the desired configuration of the control circuit 110. When the pressure of the fluid flowing from the control circuit 110 to the pilot of the control valve 121 reaches a predetermined level, the control valve 121 opens thereby flowing the fluid from the fluid supply source 300 through the control valve 121 to the check valve 122. Similarly, the pilot of the check valve 122 is fluidly connected to the control valve 121 by conduit 160. When the pressure of the fluid flowing from the control circuit 110 to the pilot of the control valve 121 reaches the predetermined level, the control valve 121 opens and flows the fluid to the pilot of the check valve 122 thereby opening the check valve 122 and flowing the fluid to the exhaust valve 123. In this manner, the control circuit 110 allows the clutch engagement circuit 120 to flow the fluid from the fluid supply source 300 to the clutch 200 upon detection of one or more conditions.

The control valve 121, check valve 122, and exhaust valve 123 can be selected based on system requirements and conditions such as fluid type, temperature, pressure, flow rate and so forth. An example of a suitable control valve 121 for use with this invention includes, but is not limited to, a 4-way control valve (Part No. VAP-44022-150), which is available from Versa™ Products Company, Inc. of Paramus, N.J. An example of a suitable check valve 122 for use with this invention includes, but is not limited to, a pilot operated check valve (Part No. B6M00AD), which is available from NGT™, LLC of Elm Grove, Wis. An example of a suitable exhaust valve 123 for use with this invention includes, but is not limited to, a quick release valve (Part No. 032018), which is available from Velvac™ Inc. of New Berlin, Wis.

The fluid powered circuit 100 can also include at least one status indicator 150 for communicating at least one, but preferably both of the following conditions: (1) if the fluid entering the clutch engagement circuit 120 is at a sufficient or insufficient pressure to engage the gearbox clutch 200, and/or (2) if the clutch 200 is engaged or disengaged. The status indicator 150 is preferably located on the control panel 140 to permit the operator to easily see it. For example, as discussed above, the pressure sensor 124 can detect the pressure of the fluid at or near the entrance of the clutch engagement circuit 120 (e.g., the pressure sensor 124 can be fluidly connected to a port of the control valve 121). If the pressure of the fluid is sufficient to engage the clutch 200, then the pressure sensor 124 can send a signal to the status indicator 150 communicating to the operator that the pressure of the fluid is sufficient. On the other hand, if the pressure of the fluid is not sufficient to engage the clutch 200, then the pressure sensor 124 can send a signal to the status indicator 150 communicating to the operator that the pressure of the fluid is not sufficient. It should be appreciated that the signal from any sensor described herein to and/or from another component (e.g., status indicator 150, solenoid valve 111, and so forth) can be transmitted by any conventional transmission means, including, but not limited to, wire or cable 170.

Similarly, the fluid powered circuit 100 can include a clutch engagement sensor 125 configured to determine the status of the clutch 200, e.g., engaged, disengaged, and so forth. In an embodiment, the clutch engagement sensor 125 is located at or near the exhaust valve 123 (e.g., the clutch engagement sensor 125 can be fluidly connected to a port of the exhaust valve 123, and it can detect the pressure of the fluid at that location). If the pressure of the fluid is sufficient to engage the clutch 200, then the clutch engagement sensor 125 can send a signal to the status indicator 150 communicating to the operator that the clutch 200 is engaged. On the other hand, if the pressure of the fluid is not sufficient to engage the clutch 200, then the clutch engagement sensor 125 sends a signal to the status indicator 150 communicating to the operator that the clutch 200 is disengaged. It should be appreciated that the clutch engagement sensor 125 can be selected based on system requirements and conditions such as fluid type, flow, pressure, temperature, and so forth. An example of a clutch engagement sensor 125 for use with this invention includes, but is not limited to, a mechanical pressure switch (Part No. 00-1-2-15/225-), which is available from Noshok™ Inc. of Berea, Ohio.

The operation of the fluid powered circuit 100 is now described in relation to a pneumatically operated clutch 200 requiring the following concurrent conditions: (1) the pressure of the fluid entering the clutch engagement circuit 120 must be about 100 psig to engage the clutch 200, and (2) the speed of the shaft is at or below about 125% of the recommended idling speed of about 800 RPM (i.e., at or below about 1000 RPM). Of course, it should be appreciated the fluid pressure and shaft speed values specified for the above-mentioned concurrent conditions are largely dependent upon the gearbox system (e.g., type of clutch, fluid type, available fluid pressure, motor type, and so forth). That is, the values specified for the fluid pressure and shaft speed can vary depending upon the requirements associated with the gearbox system. Moreover, as will be apparent to one having ordinary skill in the art, slight modifications, substitutions and/or alterations to the fluid powered circuit 100 may be required depending on the type of clutch, type of fluid operating the clutch, and so forth. For example, in the case of a clutch operated by hydraulic fluid, the fluid supply source 300 is preferably a hydraulic pump and the fluid powered circuit 100 preferably vents the hydraulic fluid to a vessel at or near atmospheric pressure instead of directly to the atmosphere when the fluid powered circuit 100 is not flowing the fluid to the clutch 200. It should be understood that such modifications, substitutions and alterations are within the spirit and scope of the invention described herein.

In operation, the fluid flows from the fluid supply source 300 through conduit 160 and enters the fluid powered circuit 100 associated with the clutch 200 of the gearbox. The speed sensor 113 measures the speed of the shaft, and the pressure sensor 124 measures the pressure of the fluid entering the clutch engagement circuit 120. As shown in FIG. 1, when the pressure sensor 124 determines that (1) the pressure of the fluid entering the clutch engagement circuit 120 is at least about 100 psig (i.e., sufficient to engage the clutch 200) and (2) the speed sensor 113 determines the shaft speed is at or below about 1000 RPM (i.e., at or below about 125% of the recommended idling speed), then each sensor sends its respective signal to the solenoid valve 111 thereby opening it and allowing the fluid to flow to the manually operated valve 112. The pressure sensor 124 sends its signal to the status indicator 150 which notifies the operator that the fluid pressure is adequate to engage the clutch 200. The operator can then open the manually operated valve 112 which allows fluid to flow to the pilot of the control valve 121. The control valve 121 will flow the fluid from the fluid supply source 300 to the pilot of the check valve 122. The check valve 122 will permit the fluid to flow from the spring loaded clutch cylinder through the exhaust valve 123 through the check valve 122 and through the control valve 121. The spring loaded clutch cylinder will shift and the clutch 200 will disengage. The clutch engagement sensor 125 will detect insufficient pressure of the fluid at the exhaust valve 123 and send its signal to the status indicator 150 communicating that the clutch 200 is disengaged.

As shown in FIGS. 2 and 3, when the pressure sensor 124 determines that (1) the pressure of the fluid entering the clutch engagement circuit 125 is at least about 100 psig (i.e., sufficient to engage the clutch 200) and (2) the speed sensor 113 determines the shaft speed is above about 1000 RPM (i.e., above about 125% of the recommended idling speed), then each sensor sends its respective signal to the solenoid valve 111. The speed sensor 113 will detect that the shaft speed condition is not met, which closes the solenoid valve 111 thereby not permitting the fluid to flow to the manually operated valve 112. The pressure sensor 124 also sends its signal to the status indicator 150 which notifies the operator that the fluid pressure is adequate to engage the clutch 200. Because the shaft speed condition is not met, the control valve 121 will not flow the fluid from the fluid supply source 300 to the pilot of the check valve 122. The check valve 122 will not permit the fluid to flow from the spring loaded clutch cylinder through the exhaust valve 123 through the check valve 122 and through the control valve 121. The spring loaded clutch cylinder will not shift and the clutch 200 will remain engaged. The pressure sensor 124 of the clutch engagement circuit 125 will detect insufficient fluid pressure and the clutch engagement circuit 125 will send its signal to the status indicator 150 communicating that the clutch 200 remains engaged.

Figure 4:
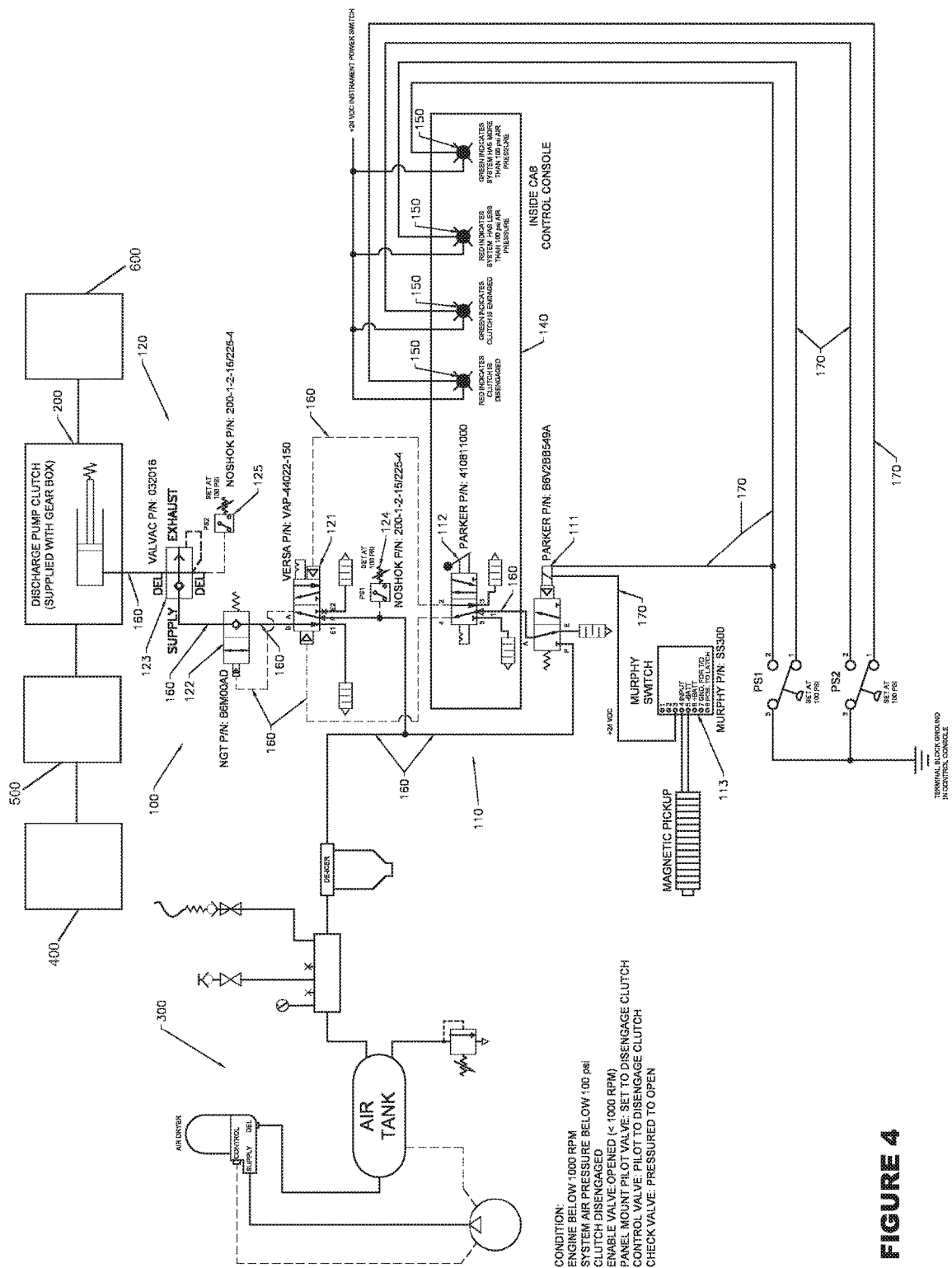
FIG. 4 illustrates an embodiment of a fluid powered circuit in accordance with this invention with the clutch disengaged.

As shown in FIG. 4, when the pressure sensor 124 determines that (1) the pressure of the fluid entering the clutch engagement circuit 120 is below about 100 psig (i.e., insufficient to engage the clutch 200) and (2) the speed sensor 113 determines the shaft speed is at or below about 1000 RPM (i.e., at or below about 125% of the recommended idling speed), then each sensor sends its respective signal to the solenoid valve 111. The speed sensor 113 will detect that the shaft speed condition is met. The pressure sensor will detect that the fluid pressure is inadequate to engage the clutch 200, which closes the solenoid valve 111 thereby not permitting the fluid to flow to the manually operated valve 112. Because the pressure condition is not met, the control valve 121 will not flow the fluid from the fluid supply source 300 to the pilot of the check valve 122. The check valve 122 will flow fluid from the spring loaded clutch cylinder through the exhaust valve 123 through the check valve 122 and through the control valve 121. The clutch engagement sensor 125 will detect insufficient pressure of the fluid at the exhaust valve 123 and send its signal to the status indicator 150 communicating that the clutch 200 is disengaged.

A fluid powered circuit 100 for a gearbox and a method for protecting a gearbox have been disclosed. The fluid powered circuit 100 includes a control circuit 110 operatively connected to a clutch engagement circuit 120. The fluid powered circuit 100 is selectively operable to either flow a fluid from a fluid supply source 300 to the clutch 200 or vent the fluid to the atmosphere. The method for protecting the gearbox includes flowing the fluid from the fluid supply source 300 to fluid powered circuit 100, measuring the speed of the shaft, measuring the pressure of the fluid entering the clutch engagement circuit 110, and flowing the fluid from the fluid powered circuit 100 to the clutch 200 upon detecting one or more conditions.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise. Furthermore, aspects of the invention may comprise, consistent essentially of, or consist of the indicated elements or method steps.

Any reference to patents, documents and other writings contained herein shall not be construed as an admission as to their status with respect to being or not being prior art. Unless the meaning is clearly to the contrary, all ranges set forth herein are deemed to be inclusive of the endpoints. Although the present invention and its advantages have been described in detail, it is understood that the array of features and embodiments taught herein may be combined and rearranged in a large number of additional combinations not directly disclosed, as will be apparent to one having ordinary skill in the art. The invention disclosed herein may be practiced in the absence of any element which is not specifically disclosed herein. It should be understood that various changes, substitutions and alterations can be made herein without departing from the spirit and scope of the invention as defined by the following claims. There are, of course, other embodiments, which are alternatives to the foregoing descriptions of the invention, which are intended to be included within the scope of the invention, as defined by the following claims.

What is claimed is:

1. A fluid powered circuit for a gearbox, the gearbox comprising a shaft actuated by a motor through a clutch, the fluid powered circuit comprising:
    a) a control circuit; and
    b) a clutch engagement circuit operatively connected to the control circuit;
    wherein
        the fluid powered circuit is selectively operable to either flow a fluid from a fluid supply source to the clutch or vent the fluid to atmosphere, and
        the fluid powered circuit is configured to flow the fluid from the fluid supply source to the clutch upon detecting at least two concurrent conditions: i) the pressure of the fluid entering the clutch engagement circuit is sufficient to engage the clutch and ii) the shaft has a speed which is at or below about 125% of its idling speed.

2. The fluid powered circuit of claim 1 wherein the speed of the shaft is at or below about 1000 RPM.

3. The fluid powered circuit of claim 1 wherein the control circuit comprises:
    a) a solenoid valve in fluid communication with the fluid supply source; and
    b) a manually operated valve in fluid communication with the solenoid valve.

4. The fluid powered circuit of claim 3 wherein the control circuit is configured to allow the clutch engagement circuit to flow the fluid from the fluid supply source to the clutch if the pressure of the fluid is sufficient to engage the clutch, and the speed of the shaft is at or below about 125% of its idling speed.

5. The fluid powered circuit of claim 4 wherein the solenoid valve is operatively connected to a shaft speed sensor and a fluid pressure sensor.

6. The fluid powered circuit of claim 5 wherein the manually operated valve comprises:
    a toggle valve configured to selectively flow the fluid to the clutch engagement circuit.

7. The fluid powered circuit of claim 4 wherein the clutch engagement circuit comprises:
    a) a control valve in fluid communication with the fluid supply source; and
    b) a check valve in fluid communication with the control valve.

8. The fluid powered circuit of claim 7 wherein the clutch engagement circuit further comprises:
    a) an exhaust valve configured to enable evacuation of fluid pressure from the clutch at a rate sufficient to prevent the clutch from partially slipping.

9. The fluid powered circuit of claim 8 further comprising at least one status indicator for communicating at least one of the following conditions:

a) if the fluid entering the clutch engagement circuit is at a sufficient or insufficient pressure to engage the clutch; or
b) if the clutch is engaged or disengaged.

10. The fluid powered circuit of claim 1 wherein the fluid powered circuit is configured to prevent disengagement of the clutch if the pressure of the fluid is not sufficient to engage the clutch.

11. The fluid powered circuit of claim 9 wherein the fluid powered circuit is pneumatically operated.

12. A fluid powered circuit for a gearbox, the gearbox having a shaft actuated by a motor through a clutch, the fluid powered circuit comprising:
   a) a control circuit comprising:
      i) a solenoid valve in fluid communication with a fluid supply source; and
      ii) a manually operated valve in fluid communication with the solenoid valve;
   b) a clutch engagement circuit comprising:
      i) a control valve in fluid communication with the fluid supply source;
      ii) a check valve in fluid communication with the control valve; and
      iii) an exhaust valve configured to enable evacuation of fluid pressure from the clutch at a rate sufficient to prevent the clutch from partially slipping;
   wherein
      the clutch engagement circuit is operatively connected to the control circuit; and
   the fluid powered circuit is selectively operable to either flow the fluid from the fluid supply source to the clutch or vent the fluid to atmosphere, and
      the fluid powered circuit is configured to flow the fluid from the fluid supply source to the clutch upon detecting at least two concurrent conditions: i) the pressure of the fluid entering the clutch engagement circuit is sufficient to engage the clutch and ii) the shaft has a speed which is at or below about 125% of its idling speed.

13. The fluid powered circuit of claim 12 wherein the speed of the shaft is at or below 1000 RPM.

14. The fluid powered circuit of claim 13 wherein the solenoid valve is operatively connected to a shaft speed sensor and a fluid pressure sensor.

15. The fluid powered circuit of claim 14 wherein the manually operated valve comprises:
   a toggle valve configured to selectively flow the fluid to the clutch engagement circuit.

16. The fluid powered circuit of claim 15 further comprising at least one status indicator for communicating at least one of the following conditions:
   a) the pressure of the fluid entering the clutch engagement circuit is sufficient or insufficient to engage the clutch; or
   b) the clutch is engaged or disengaged.

17. The fluid powered circuit of claim 16 wherein the fluid powered circuit is pneumatically operated.

18. A method for protecting a gearbox, the gearbox comprising a shaft actuated by a motor through a clutch, the method comprising:
   1) flowing a fluid from a fluid supply source to a fluid powered circuit;
   2) measuring a speed of the shaft;
   3) measuring a pressure of the fluid entering a clutch engagement circuit; and
   4) flowing the fluid from the fluid powered circuit to the clutch upon detecting that the pressure of the fluid entering the clutch engagement circuit is sufficient to engage the clutch, and that the shaft has a speed which is at or below about 125% of its idling speed.

19. The method for protecting a gearbox according to claim 18, further comprising:
   5) providing a status indicator that the fluid entering the clutch engagement circuit is at a sufficient or insufficient pressure to engage the clutch.

20. The method for protecting a gearbox according to claim 19, further comprising:
   6) providing status indicator that the clutch is engaged or disengaged.

21. The method for protecting a gearbox according to claim 20, wherein the fluid powered circuit comprises:
   a) a control circuit comprising:
      i) a solenoid valve in fluid communication with the fluid supply source; and
      ii) a manually operated valve in fluid communication with the solenoid valve;
   b) a clutch engagement circuit comprising:
      i) a control valve in fluid communication with the fluid supply source;
      ii) a check valve in fluid communication with the control valve; and
      iii) an exhaust valve configured to enable evacuation of fluid pressure from the clutch at a rate sufficient to prevent the clutch from partially slipping.

22. The method of claim 21 wherein the fluid powered circuit is pneumatically operated, and wherein the speed of the shaft is at or below about 1000 RPM.

* * * * *